UNITED STATES PATENT OFFICE.

OSKAR MATTER, OF COLOGNE, GERMANY.

METHOD OF MANUFACTURING POLYVALENT ALCOHOLS.

1,237,076.  Specification of Letters Patent.  Patented Aug. 14, 1917.

No Drawing.  Application filed July 14, 1915. Serial No. 39,861.

*To all whom it may concern:*

Be it known that I, OSKAR MATTER, chemical engineer, citizen subject of Switzerland, residing at Cologne, Province of the Rhine, Germany, Vorgebirgstr. 33, have invented a new and useful Method of Manufacturing Polyvalent Alcohols; and I do hereby declare the following to be a full, clear, and exact description of the same.

Hitherto divalent and polyvalent alcohols were produced by reacting with caustic alkali or potassium carbonate on the corresponding halogen compounds of aliphatic hydrocarbons, as for instance

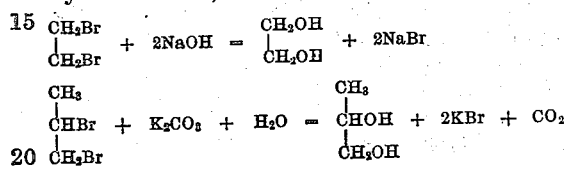

However, these methods yield an insufficient output in divalent alcohols because the dihalogen compounds easily disengage hydrohalogenic acid and thereby are transformed into the hardly reactive monohalogen compounds of the corresponding alkylenes according to the following equation:

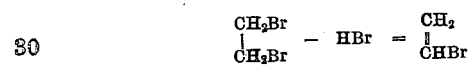

In the manufacture for instance of glycol, the reaction mentioned above proceeds simultaneously with the formation of glycol and takes away considerable quantities of ethylenic bromid by forming vinylic bromid.

Now, I have found that one can totally eliminate this undesirable secondary reaction, by replacing the strongly alkaline substances, such as caustic soda, etc., by substances which combine in the same way with acids but have only a very weak alkalinity. For this purpose the bicarbonates of alkali metals have proved best. If for instance dichlorinated aliphatic hydrocarbons are heated up to a rather high temperature in a closed vessel in the presence of alkali bicarbonate and water, the corresponding glycols can be obtained almost without any losses. Apparently the carbonic acid formed during the reaction and filling the vessel is of importance for an easy proceeding of the reaction.

Instead of alkali metal bicarbonates, mixtures of alkali metal carbonates with bicarbonates may be employed.

If the conditions mentioned above are maintained, that is to say if the reaction is carried out in a closed vessel in presence of water, one can also start from alkali metal carbonates. If, for instance, one has begun to carry on the process with a solution of sodium carbonate, there will be formed in the reaction vessel a body of carbonic acid gas which together with the solution of sodium carbonate will cause the formation of sodium bicarbonate. If therefore care is taken for maintaining in the vessel an atmosphere of carbonic acid gas the process may also be carried out by using alkali metal carbonates instead of bicarbonates. Evidently it is preferable using carbonates with regard to their greater solubility, because it is possible to use more concentrated solutions and to introduce the reagent in liquid form into the reaction vessel whereas the bicarbonates are mostly to be introduced in solid form.

I have found that it is of importance to maintain in the reaction vessel an excess of water over the chlorinated hydrocarbon to be acted on. This may be effected, for instance with a view of manufacturing glycol, in such a manner that the ethylenic chlorid is introduced little by little into the reaction vessel in such a way that continually a great quantity of liquid is present with regard to a relatively small amount of ethylenic chlorid.

It is possible to advance the reaction and to shorten the time required by adding to the reaction fluid such materials as for instance metals, copper, etc., which are known as catalysts. Preferably during the reaction the liquid is stirred.

Finally the glycols are obtained in anhydrous form by concentrating the solution and consequently distilling under diminished pressure in a known manner.

The method may be illustrated by the following example for preparing ethylenic glycol: 100 parts (in weight) of ethylenic dichlorid $CH_2Cl.CH_2Cl$ (boiling point 80 to 85 degrees centigrade) are heated together with a solution of 180 parts (in weight) of sodium bicarbonate in 1900 parts (in weight) of water in a closed vessel during 6 hours at a temperature of 130 to 140 degrees centigrade, the liquid being stirred and a sheet of copper being used as catalyst. After being cooled the liquid is neutralized, for instance by adding hydrochloric acid, then it is concentrated and fractionally distilled. In this way about 50 to 55 grams of ethylenic glycol (boiling point 195 to 198 degrees centigrade) are obtained.

When working according to the method as described in a closed vessel, there may arise (specially if highly concentrated glycols are to be manufactured) very high pressures. In order to use even in such conditions low pressure vessels it is advisable to remove the excess of carbonic acid formed in the reaction as well as difficultly condensable ethylenic chlorid from the reaction vessel at suitable intervals and to pass same into a second vessel in such a manner that the pressure in the reaction vessel is maintained on a relatively low level.

What I claim is:

1. Method of producing polyvalent alcohols which consists in heating a chlorinated hydrocarbon in a closed vessel with alkali metal bicarbonate and water in the presence of copper, the amount of water highly exceeding that of unaltered chlorinated hydrocarbon present.

2. Method of producing polyvalent alcohols which consists in heating a chlorinated hydrocarbon in a closed vessel with a mixture of alkali metal carbonate with alkali metal bicarbonate and water in the presence of copper, the amount of water highly exceeding that of unaltered chlorinated hydrocarbon present.

3. Method of producing polyvalent alcohols which consists in heating a chlorinated hydrocarbon in a closed vessel with a solution of alkali metal carbonate in water in the presence of carbonic acid and of copper, the amount of water highly exceeding that of unaltered hydrocarbon present.

4. Method of producing polyvalent alcohols which consists in heating a chlorinated hydrocarbon in a closed vessel with a solution of alkali metal carbonate in water in the presence of copper, the amount of water highly exceeding that of unaltered chlorinated hydrocarbon present.

In testimony whereof, I have signed my name to this specification in the presence of two subscribing witnesses.

OSKAR MATTER.

Witnesses:
HENRY HASPER,
WOLDEMAR HAUPT.